Nov. 10, 1964 T. R. WILLIAMS 3,156,873

DIFFERENTIAL AMPLIFIER

Filed Aug. 12, 1960 4 Sheets-Sheet 1

INVENTOR.
THOMAS R. WILLIAMS
BY
Philip Schneider
ATTORNEY

Nov. 10, 1964 T. R. WILLIAMS 3,156,873

DIFFERENTIAL AMPLIFIER

Filed Aug. 12, 1960 4 Sheets-Sheet 2

INVENTOR.
THOMAS R. WILLIAMS
BY
Philip Schneider
ATTORNEY

Nov. 10, 1964 T. R. WILLIAMS 3,156,873

DIFFERENTIAL AMPLIFIER

Filed Aug. 12, 1960 4 Sheets-Sheet 3

INVENTOR.
THOMAS R. WILLIAMS
BY
Philip Schneider
ATTORNEY

Nov. 10, 1964 T. R. WILLIAMS 3,156,873
DIFFERENTIAL AMPLIFIER
Filed Aug. 12, 1960 4 Sheets-Sheet 4

INVENTOR.
THOMAS R. WILLIAMS
BY
Philip Schneider
ATTORNEY 3,156,873
DIFFERENTIAL AMPLIFIER Thomas R. Williams, Princeton, N.J., assignor to the United States of America as represented by the Secretary of the Navy Filed Aug. 12, 1960, Ser. No. 49,399
6 Claims. (Cl. 330—69)

This invention relates to differential amplifiers and particularly to an amplifier capable of providing two output signals, one of which is proportional to the difference of two input voltages and the other of which is the negative counterpart of the first.

The use of differential amplifiers is well established in the electronic art wherever it is necessary to obtain an output voltage which is proportional to the difference between two input voltages, such as in computing machines. The present invention is especially useful in applications in which a differential signal and/or its negative counterpart are desired, for example, where the differential signal is to be observed visually by means of an oscilloscope. Each of the two signals can here be applied to a different one of the oscilloscope deflection plates.

The objects and advantages of the present invention are accomplished by employing a pair of identical amplifiers in a push-pull arrangement, each of the amplifiers amplifying a different input signal, and feeding back all, or a portion of the A.C. signal variation across the load of each stage to the cathode circuit of the other stage. In a preferred embodiment of the invention, the output signals are obtained from the points in the cathode circuits of the stages to which the A.C. signal variations are fed back.

A typical embodiment of the present invention comprises a pair of push-pull amplifier stages which are balanced with respect to ground. A pair of seriesed resistors are inserted between the cathode of the electron tube in each stage and ground. The A.C. potential variation across the load resistance of each tube, or a portion thereof, is fed back to the junction between the cathode resistors of the other tube. The input signals whose difference is to be obtained are fed into the control grids of the two tubes, one signal to each tube. The output signals are derived from the junctions between the cathode resistors of each tube.

An object of this invention is to provide a differential signal and its negative counterpart.

Another object is to provide a differential electronic amplifier which is very insensitive to changes in tube parameters and in supply voltages.

A further object is to provide a differential amplifier which has the features described above and is capable of operation over a wide frequency band.

Other objects and many of the attendant advantages of this invention will be readily appreciated as the same becomes better understood by reference to the following detailed description when considered in connection with the accompanying drawings therein:

Figure 1:
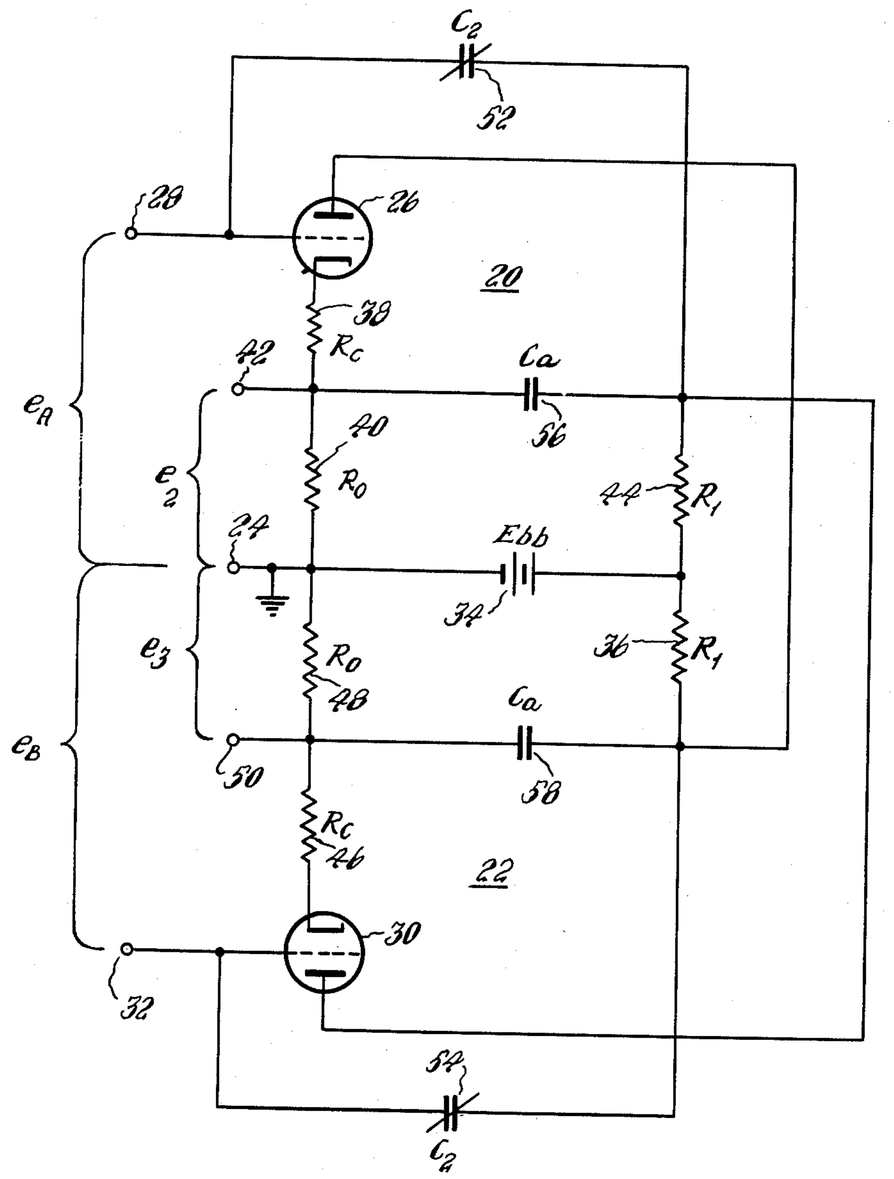
FIG. 1 is a schematic circuit diagram of an embodiment of the invention.

In FIG. 1, a pair of push-pull amplifier stages 20 and 22 are connected to a common point of reference potential (ground, in this case) 24, which also constitutes the ground terminal for the input and output signals.

One input signal ($e_A$) is fed to the control electrode of the triode tube 26 of stage 20 through input terminal 28. The other input signal ($e_B$) is fed to the control electrode of the triode tube 30 of the other stage 22 through input terminal 32.

A source of electrical power 34, which can be a battery or other suitable source, supplies the operating potentials for tube 26 through a load resistance 36 ($R_1$) and a pair of seriesed cathode resistances 38 ($R_c$) and 40 ($R_0$). One intput signal ($e_2$) is taken from output terminal 42 and ground terminal 24, output terminal 42 being connected directly to the junction between the cathode resistances 38 and 40.

Similarly, the operating potentials for tube 30 are supplied through load resistance 44 and seriesed cathode resistances 46 and 48. A second output signal ($e_3$) is derived from output terminal 50 and ground terminal 24, output terminal 50 being connected directly to the junction between the cathode resistances 46 and 48.

The plate end of the load resistance 44 of tube 30 is connected to the control electrode of tube 26 by means of a tunable capacitance 52 ($C_2$) and the plate end of the load resistance 36 of tube 26 is connected to the control electrode of tube 30 by means of a tunable capacitance 54.

The A.C. signal variation across the load resistance 44 of tube 30 is applied to the junction between the cathode resistances 38 and 40 of tube 26 through a capacitance 56 ($C_a$) and the A.C. signal variation across the load resistance 36 of tube 26 is applied to the junction between the cathode resistances 46 and 48 of tube 30 through a capacitance 58. Capacitances 56 and 58 must be large enough to act as an A.C. short down to the lowest frequency to be amplified.

The amplifier stages 20 and 22 are substantially identical, corresponding components in each stage being matched in value.

*Mid-Frequency Operation*

Figure 2:
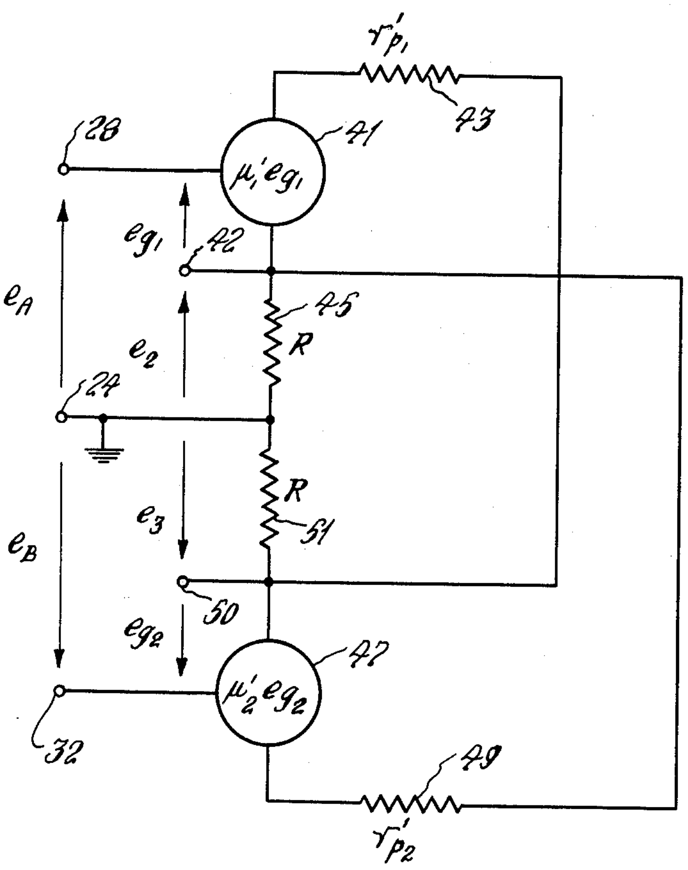
FIG. 2 is a schematic representation of the mid-frequency equivalent circuit of the embodiment of FIG. 1.

The equivalent circuit of the embodiment shown in FIG. 1 is illustrated in FIG. 2 and is useful in an analysis of the small-signal A.C. operation of the device over the mid-frequency range. Triode 26 and cathode resistance 38 can be replaced by an equivalent triode 41 having a plate resistance $\gamma'_{p1}$ (43) equal to $\gamma_{p1}+(1+\mu_1)R_c$ and an amplification factor $\mu'_1$ equal to $\mu_1$, where $\gamma_{p1}$ is the plate resistance and $\mu_1$ the amplification factor of tube 26. Resistances 44 ($R_1$) and 40 ($R_0$) can be replaced by a single resistance R (45) whose value is $$\frac{R_1R_0}{R_1+R_0}$$

The driving voltage in the equivalent circuit is equal to $\mu'_1e_{g1}$ where $e_{g1}=e_A-e_2$. Similarly, tube 30 and its resistances can be replaced by a similar equivalent triode 47 and resistances 49 and 51.

Standard mathematical analysis of the equivalent circuit of FIG. 2 shows that $$e_2=\frac{R}{1+\left(\frac{2+\mu'_1}{\gamma'_{p1}}\right)R+\left(\frac{2+\mu'_2}{\gamma'_{p2}}\right)R}\left[\left(\frac{\mu'_1}{\gamma'_{p1}}\right)e_A-\left(\frac{\mu'_2}{\gamma'_{p2}}\right)e_B\right]$$

and that $e_3=-e_2$. If $$\frac{\mu'_1}{\gamma'_{p1}}=\frac{\mu'_2}{\gamma'_{p2}}$$

(i.e., if the mutual transconductance [$g'_{m1}$ and $g'_{m2}$] of the two equivalent triodes are equal), the output voltage $e_2$ is proportional to the difference between the input voltages $e_A$ and $e_B$.

Now the mutual transconductance $[g'_{m_1}]$ of the first equivalent triode 41 is $$g'_{m_1}=\frac{\mu'_1}{\gamma'_{p_1}}=\frac{1}{\frac{1}{g_{m_1}}+\frac{1+\mu_1}{\mu_1}R_c}$$

and that of the second equivalent triode 47 is $$g'_{m_2}=\frac{\mu'_2}{\gamma'_{p_2}}=\frac{1}{\frac{1}{g_{m_2}}+\frac{1+\mu_2}{\mu_2}R_c}$$

where $g_{m_1}$ is the mutual transconductance of tube 26 and $g_{m_2}$ is the mutual transconductance of tube 30.

It is apparent that if $\mu_1$ and $\mu_2 >> 1$ and $$R_c >> \frac{1}{g_{m_1}} \text{ and } \frac{1}{g_{m_2}}$$

the mutual transconductances $g'_{m_1}$ and $g'_{m_2}$ of the equivalent triodes will be approximately equal to $$\frac{1}{R_c}$$

and will, therefore, be nearly independent of the tube parameters. Thus, matched precision resistances of large value are used for cathode resistances 38 and 46 ($R_c$) and the over-all performance of the differential amplifier is made nearly independent of tube parameters.

*High-Frequency Operation*

Figure 3:
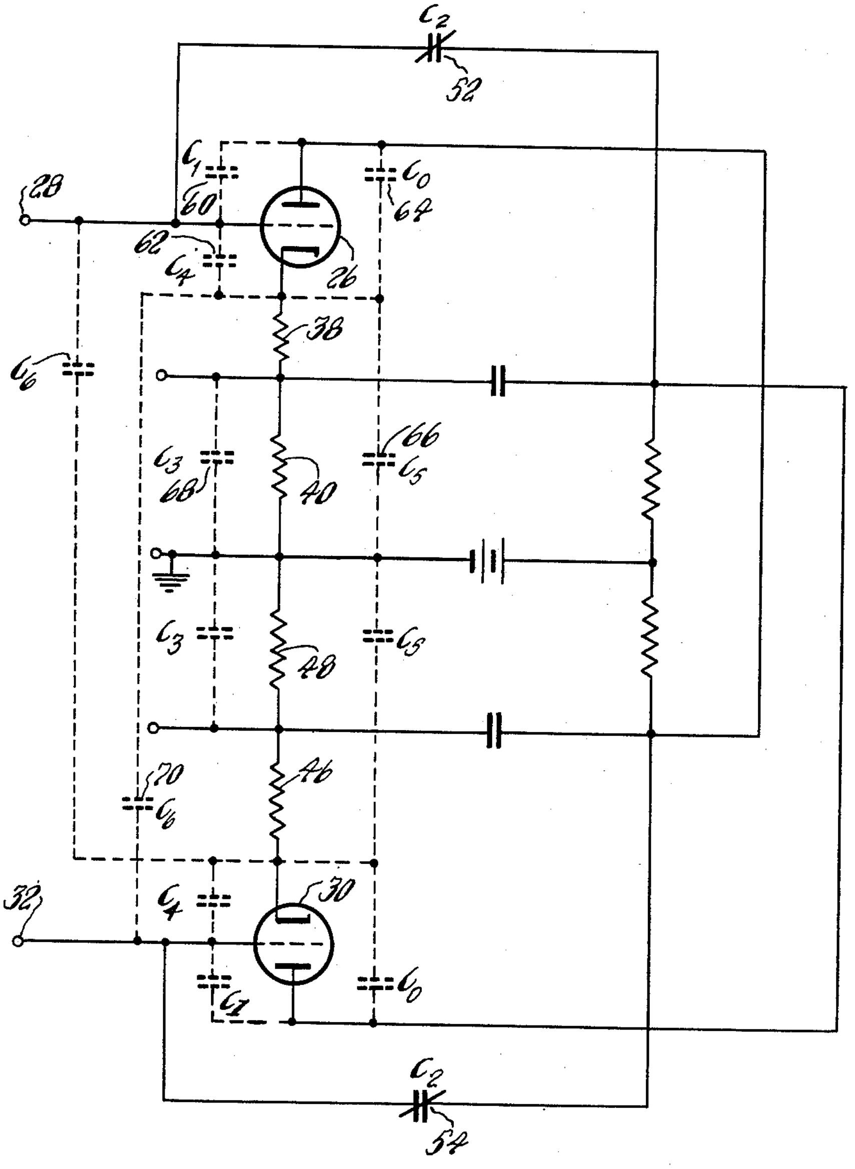
FIG. 3 is a schematic circuit diagram of the embodiment of FIG. 1 showing the distributed capacities in dotted lines.

At high frequencies, stray capacities play an important role in circuit operation. If optimum performance is to be achieved, it is necessary to compensate for the effects of these capacities. The important stray, or distributed, capacities are shown in dotted lines in FIG. 3. These are the plate-to-control electrode capacity ($C_1$) 60, the control electrode-to-cathode capacity ($C_4$) 62, the plate-to-cathode capacity ($C_0$) 64, a cathode-to-ground capacity ($C_5$) 66, a capacity across the lower cathode resistance 40 to ground ($C_3$) 68 and a capacity from the cathode to the control electrode of the other tube ($C_6$) 70. Similar capacities exist for the other tube 30, and these are shown but not numbered in FIG. 3.

Figure 4:
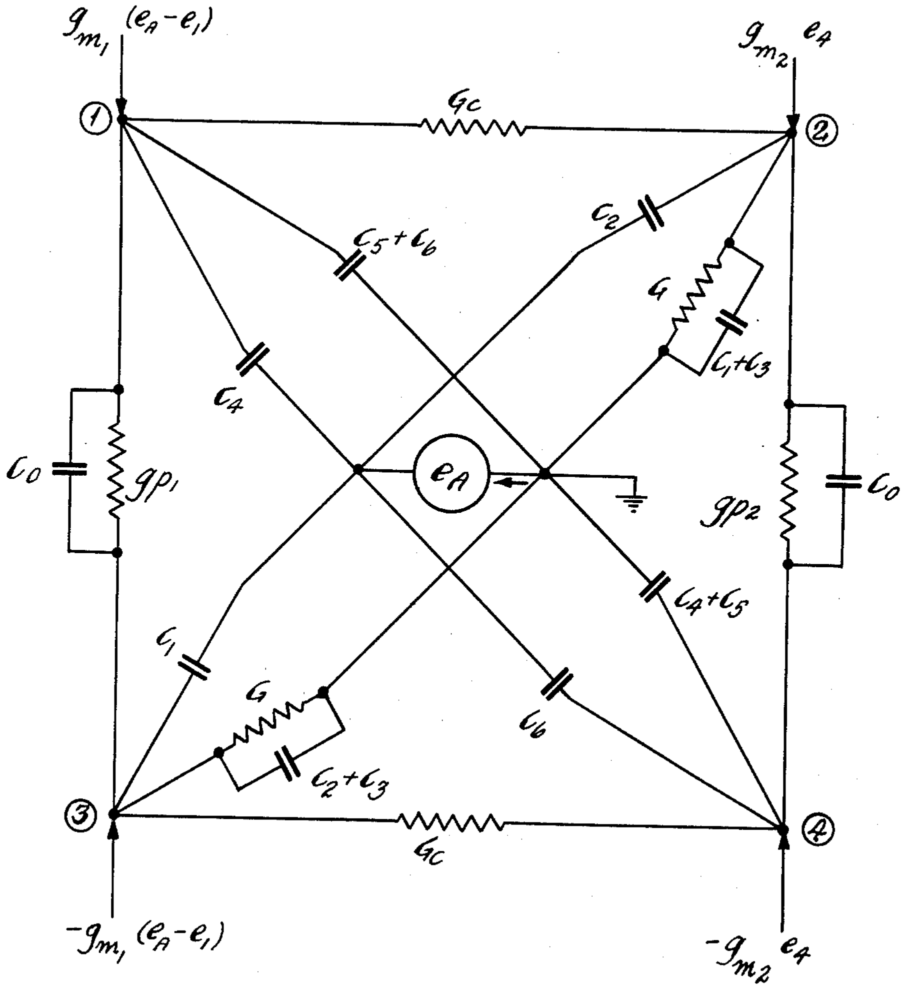
FIG. 4 is a schematic representation of the high-frequency equivalent circuit of the embodiment of FIG. 1.

High-frequency operation is best analyzed with the aid of the high-frequency equivalent circuit, which is shown as a matter of interest in FIG. 4. Here the arrows represent constant-current generators and $e_1$, $e_2$, $e_3$ and $e_4$ are the voltages with respect to ground of nodes (1), (2), (3) and (4), respectively. The symbol (G) is used to designate the conductance of any resistance (R). Thus, $G_c$ is the conductance of the resistance $R_c$.

For simplicity, it is assumed that the circuit is perfectly symmetrical, i.e., $\mu_1=\mu_2$, $\gamma_{p_1}=\gamma_{p_2}$, etc. This assumption is justified if matched components are used and the circuit wiring is done carefully.

If the circuit is symmetrical, it is only necessary to consider the high-frequency operation of the circuit with one driving voltage and, therefore, only one, $e_A$, is shown.

Input terminal 32 is considered shorted to ground and this assumption is valid if the amplifier is driven from low impedance driving sources such as cathode followers.

The node equations for FIG. 4 are:

$$e_1[G_c+g_m+Y_p+j(B_4+B_5+B_6)] -e_2G_c-e_3Y_p=e_A(g_m+jB_4) \quad \text{(I)}$$

$$-e_1G_c+e_2[G_c+Y_p+G+j(B_3+B_1+B_2)] -e_4(Y_p+g_m)=e_A(jB_2) \quad \text{(II)}$$

$$-e_1(Y_p+g_m)+e_3[G_c+Y_p+G+j(B_3+B_1+B_2)] -e_4G_c=e_A(-g_m+jB_1) \quad \text{(III)}$$

$$-e_2Y_p-e_3G_c+e_4[G_c+Y_p+g_m +j(B_4+B_5+B_6)]=e_A(jB_2) \quad \text{(IV)}$$

where B designates the susceptance of the corresponding capacity (i.e., $B=\omega C$), and $Y_p$ denotes the admittance (i.e., $Y_p=g_p+jB_0$). Since the tubes are assumed to be matched, $g_{m_1}=g_{m_2}=g_m$ and $g_{p_1}=g_{p_2}=g_p$.

For push-pull operation at high frequencies, $e_2$ should equal $-e_3$ or $e_2+e_3$ should equal 0.

Solving the node equations gives $$e_2+e_3=e_A\frac{j[g_m(B_1+B_2-B_5)+(G_c+g_p)(B_1+B_2+B_4+B_6)]-(B_1+B_2)(B_0+B_4+B_5+B_6)-B_0(B_4+B_6)}{D}$$

where $$D=G(G_c+g_p+g_m)+j[B_0G+(B_1+B_2+B_3)(G_c+g_m+g_p)+(B_4+B_5+B_6)(G_c+G+g_p)]-B_0(B_1+B_2+B_4+B_5+B_6)-(B_1+B_2+B_3)(B_4+B_5+B_6)$$

At moderately high frequencies, the constant (first) term in D predominates and the sum $e_2+e_3$ has terms proportional to $\omega$ and $\omega^2$. Since these represent departures from perfect push-pull operation, they must be minimized for best operation. The term proportional to $\omega^2$ can only be minimized by minimizing stray capacities since all of its components are of the same sign. However, the term proportional to $\omega$ will vanish if $$g_m(C_1+C_2-C_5)+(G_c+g_p)(C_1+C_2+C_4+C_6)=0$$

For $g_m >> G_c+g_p$, which is true in practice, this condition essentially becomes $C_5=C_1+C_2$ or $C_2=C_5-C_1$.

Thus, the purpose of capacitance $C_2$ is to cancel some of the effects of stray capacity and thereby increase the frequency range over which the circuit operates properly.

Low-frequency operation:

At low frequencies, the capacitances ($C_a$) 56 and 58 no longer behave as short circuits for A.C. and the mid-frequency analysis does not hold. However, in practice, it is found that if commercially available electrolytic capacitors are used, the operation of the circuit is quite satisfactory down to about 20 c.p.s.

Any device which behaves as an A.C. short circuit at all frequencies and which has a constant D.C. potential across its terminals independent of the current flowing through it can be substituted for the capacitors 56 and 58, thereby extending the low frequency range of the device to zero frequency. Examples of such devices are batteries, voltage regulator tubes and silicon diodes having constant voltage characteristics.

Values of components which have been employed successfully in the present embodiment of the invention are listed below:

| | |
|---|---|
| Tube | 12AX7 dual triode. |
| $R_1$ | 100,000 ohms. |
| $R_2$ | 50,000 ohms. |
| $R_3$ | 52,500 ohms. |
| $C_1$ | 16 mfd., 450 v. electrolytic. |
| $C_2$ | 1.5–7 mmfd. |
| $E_{bb}$ | 300 v., D.C. |

In this embodiment, the mid-frequency gain is about 0.27. For frequencies between 20 and 20,000 c.p.s., the output voltages are equal and independent of the control grid being fed to within about 0.2% (which was the accuracy of the test instruments used). The percent unbalance is less than 0.65% at 100,000 c.p.s., less than 1.65% at 200,000 c.p.s., and less than 6% at 300,000 c.p.s. The upper half-power frequency is 330,000 c.p.s.

The above values were selected especially for insensitivity to changes of supply voltages and tube parameters;

by compromising somewhat it would be possible to extend the upper half-power frequency by a factor of three or more.

Obviously many modifications and variations of the present invention are possible in the light of the above teachings. It is therefore to be understood that within the scope of the appended claims the invention may be practiced otherwise than as specifically described.

I claim:

1. A differential amplifier providing a first output signal proportional to the difference between a pair of input signals and a second output signal which is the negative counterpart of the first output signal comprising, in combination: a first amplifier stage having a pair of input terminals, one being connected to ground potential, said first amplifier stage including an electronic amplifier tube having at least a cathode, an anode and a control grid, the other of said input terminals being connected to said control grid, and the amplification factor of said tube being much greater than unity, a pair of terminals for a power supply for said electronic tube, one of said terminals being connected to ground potential, a load resistance connected between said anode and the other of said power supply terminals, a second and a third resistance connected in series between said cathode and said one input terminal, said second resistance being connected to said cathode and having a numerical value which is much greater than the reciprocal of the mutual transconductance of the tube to which it is connected, and an output terminal connected to the junction between said second and third resistances, said grounded input terminal constituting another output terminal; a second amplifier stage comprising a symmetrical duplicate of said first amplifier stage; a first capacitance connected between the anode end of said load resistance of said first stage and the junction between the cathode resistances of said second stage; and a second capacitance connected similarly between the load resistance of the second stage and the junction between the cathode resistances of the first stage, said first and second capacitances being of such value as to constitute a virtual short circuit to A.C. frequencies down to the lowest A.C. frequency which it is desired to include in the frequency range of the differential amplifier.

2. A device as set forth in claim 1, further including a third capacitance connected between said control grid of said first tube and the anode end of the load resistance of said second stage and a fourth capacitance connected between said control grid of said second tube and the anode end of the load resistance of said first stage, the values of said third and fourth capacitances being such that the sum of either of these capacitances and the distributed capacitances between the anode and control grid of either of said tubes is equal to the stray capacitance existing between the cathode of that tube and ground.

3. A differential amplifier providing a first output signal proportional to the difference between a pair of input signals and a second output signal which is the negative counterpart of the first output signal comprising, in combination: a first amplifier stage having a pair of input terminals, one being connected to a point of reference potential, said first amplifier stage including an electronic amplifying device having at least an emitting electrode, a collecting electrode and a control electrode, the other of said input terminals being connected to said control electrode, and the amplification factor of said amplifying device being much greater than unity, a pair of terminals for a power supply for said amplifying device, one of said terminals being connected to said point of reference potential, a load resistance connected between said collecting electrode and the other of said power supply terminals, a second and a third resistance connected in series between said emitting electrode and said one input terminal, said second resistance being connected to said emitting electrode and having a numerical value which is much greater than the reciprocal of the mutual transconductance of the amplifying device to which it is connected, and an output terminal connected to the junction between said second and third resistances, said one input terminal constituting another output terminal; a second amplifier stage comprising a symmetrical duplicate of said first amplifier stage; a first capacitance connected between the collecting electrode end of said load resistance of said first stage and the junction between the emitting electrode resistances of said second stage; and a second capacitance connected similarly between the load resistance of the second stage and the junction between the emitting electrode resistances of the first stage, said first and second capacitances being of such value as to constitute a virtual short circuit to A.C. frequencies down to the lowest A.C. frequency which it is desired to include in the frequency range of the differential amplifier.

4. A device as set forth in claim 3, further including a third capacitance connected between said control electrode of said first amplifying device and the connecting electrode end of the load resistance of said second stage and a fourth capacitance connected between said control electrode of said second amplifying device and the collecting electrode end of the load resistance of said first stage, the values of said third and fourth capacitances being such that the sum of either of these capacitances and the distributed capacitance between the collecting electrode and the control electrode of either of said amplifying devices is equal to the stray capacitances existing between the emitting electrode of that amplifying device and said point of reference potential.

5. A differential amplifier providing a first output signal proportional to the difference between a pair of input signals and a second output signal which is the negative counterpart of the first output signal comprising, in combination: a first amplifier stage having a pair of input terminals, one being connected to a point of reference potential, said first amplifier stage including an electronic amplifying device having at least an emitting electrode, a collecting electrode and a control electrode, the other of said input terminals being connected to said control electrode, and the amplification factor of said amplifying device being much greater than unity, a pair of terminals for a power supply for said amplifying device, one of said terminals being connected to said point of reference potential, a load impedance connected between said collecting electrode and the other of said power supply terminals, a second and a third impedance connected in series between said emitting electrode and said one input terminal, said second impedance being connected to said emitting electrode and having a numerical value which is much greater than the reciprocal of the mutual transconductance of the amplifying device to which it is connected, and an output terminal connected to the junction between said second and third impedances, said one input terminal constituting another output terminal; a second amplifier stage comprising a symmetrical duplicate of said first amplifier stage; a first capacitance connected between the collecting electrode end of said load impedance of said first stage and the junction between the emitting electrode impedances of said second stage; and a second capacitance connected similarly between the load impedance of the second stage and the junction between the emitting electrode impedances of the first stage, said first and second capacitances being of such value as to constitute a virtual short circuit to A.C. frequencies down to the lower A.C. frequency which it is desired to include in the frequency range of the differential amplifier.

6. A device as set forth in claim 5, further including a third capacitance connected between said control electrode of said first amplifying device and the collecting electrode end of the load impedance of said second stage and a fourth capacitance connected between said control electrode of said second amplifying device and the collecting electrode end of the load impedance of said first stage, the values of said third and fourth capacitances being such that the sum of either of these capacitances and the distributed capacitance between the collecting electrode and the control electrode of either of said amplifying devices is equal to the stray capacitance existing between the emitting electrode of that amplifying device and said point of reference potential.

References Cited in the file of this patent

UNITED STATES PATENTS

| | | |
|---|---|---|
| 2,411,517 | Busignies | Nov. 26, 1946 |
| 2,763,732 | Rockwell | Sept. 18, 1956 |

FOREIGN PATENTS

| | | |
|---|---|---|
| 892,851 | France | Jan. 17, 1944 |
| 1,069,689 | Germany | Nov. 26, 1959 |